March 4, 1969 W. KOWALCZYK 3,430,908
CURTAIN ROD BRACKET
Filed July 21, 1967
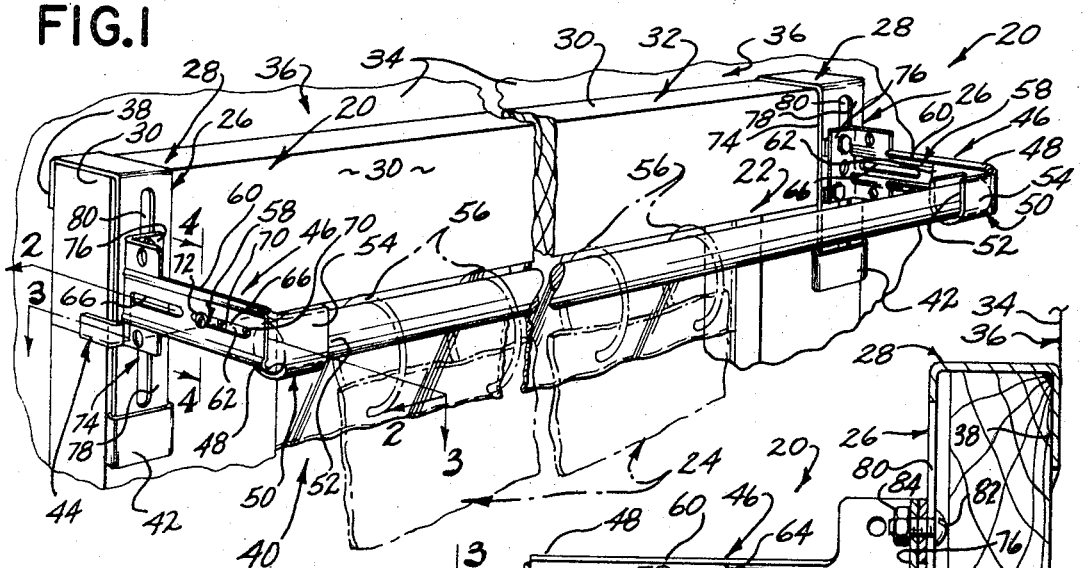
FIG. 1
FIG. 2
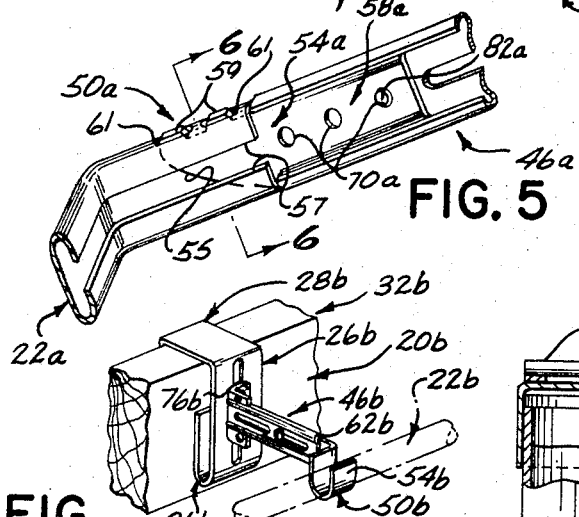
FIG. 5
FIG. 7
FIG. 3
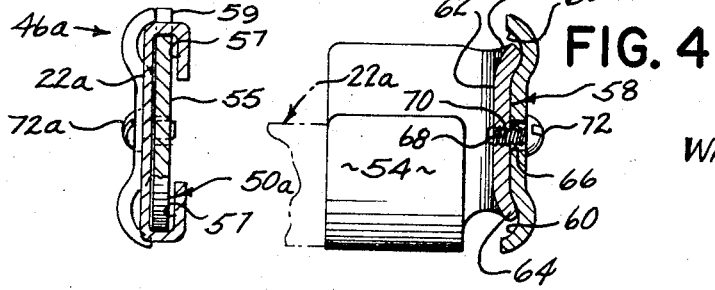
FIG. 6
FIG. 4
INVENTOR.
WALTER KOWALCZYK United States Patent Office 3,430,908
Patented Mar. 4, 1969

3,430,908
CURTAIN ROD BRACKET
Walter Kowalczyk, 14647 Brest,
South Gate, Mich. 48192
Filed July 21, 1967, Ser. No. 655,088
U.S. Cl. 248—265                                        1 Claim
Int. Cl. A47h 1/142, 1/122

ABSTRACT OF THE DISCLOSURE

A curtain rod bracket adapted to be removably mounted on a window molding strip including a mounting base strip member provided at the top with a downwardly extending hook member and further being provided with a forwardly extending projection member which has means to support a curtain rod.

---

Generally speaking, the present invention relates to bracket apparatus for mounting on a wall by being hooked over an upper edge of a molding strip and when so mounted, adapted to project outwardly therefrom so that two or more such brackets, when so mounted in appropriately laterally spaced relationship with respect to a well surface, are adapted to support or carry either what is known as a traverse rod for mounting draperies or curtains thereon or what is known in the prior art as a curtain rod which normally is adapted to mount a curtain or a plurality of curtains thereon in a transversely slidable manner, so that such draperies or curtains can be transversely moved therealong so as to hang in a desired position with respect to a wall surface or a window mounted in a wall.

One major advantage of the present invention over prior art curtain rod brackets, traverse rod mounting brackets, or similar hardware is the fact that no mounting nails or screws need be driven into the conventional molding strip or wall surface for mounting the apparatus, as is normally the case with prior art brackets and hardware intended for generally similar purposes. This is a major advantage since the conventional molding strip customarily mounted over a window opening in a wall in a horizontally directed manner and along side edges of such a window opening in a wall in a vertically directed manner, is very often made of relatively soft wood which is easily split when fastening nails are driven thereinto or fastening screws are threaded thereinto for mounting such conventional prior art curtain rod brackets or traverse drapery rod brackets. This type of prior art damage to the molding strip may require that it be repaired with "Plastic Wood," putty, or, in some cases, various other fillers. However, in certain instances, the damage to the molding strip produced by such fastening nails and screws, particularly if such a fastening operation is performed several different times, may be such as to acaually require replacement of the molding strip.

The novel bracket apparatus of the present invention completely eliminates and overcomes the above-mentioned prior art problem and disadvantage since no fastening nails or screws are required to properly mount it with respect to a molding strip on a wall—the attachment hook of the present invention merely being slipped over the top edge of the molding strip and pulled downwardly into snug mounting engagement therewith with the rear downwardly directed portion of the inverted U-shaped attachment hook sliding into a position between the rear surface of the molding strip and the adjacent outer surface of the wall on which the molding strip is mounted. This is usually easily accomplished since the molding strip is usually not directly attached to the wall surface at its top edge. However, in some instances, it may be necessary to first clear an open region between the rear surface of the molding strip and the outer surface of the wall by pushing a knife blade downwardly therebetween to definitely insure that there is an open region sufficiently large to receive the downwardly directed rear portion of the attachment hook between the wall surface and the molding strip.

The mounting arrangement of the present invention briefly described above provides for very firm mounting of each bracket and allows it to be positioned at any desired location along the molding strip as determined by the intended conditions of use. Also, it should be noted that in the event that the wall, the inside window trim and/or molding strip is to be repainted, each attachment hook of each such bracket may be merely slidably moved upwardly and disengaged from the corresponding molding strip portion so that the entire bracket is effectively removed from the wall and the molding strip, thus greatly facilitating such a repainting operation. After completion of such a repainting operation and the drying of the paint, the attachment hook of each bracket can then be remounted in its proper desired location on the molding strip without damage to adjacent newly painted surfaces. This is a very decided advantage over the conventional prior art practice when such repainting is intended, which requires that a hammer or other prying tool be employed for pulling the fastening nails out of the molding strip or that a screwdriver be employed for unscrewing fastening screws from the molding strip so that previously mounted conventional prior art drapery traverse rod brackets or curtain rod brackets can be removed to facilitate such a repainting operation. This is likely to damage the molding strip or wall surface and the replacement operation where the fastening nails or screws are again hammered into or screwed into the repainted molding strip portion or wall surface region is quite likely to produce a considerable amount of damage to freshly painted adjacent surface areas.

With the above points in mind, it is an object of the present invention to provide a novel drapery traverse or curtain rod mounting bracket apparatus for use in supporting draperies or curtains and requiring no penetrating fastening elements such as nails, screws, or the like, for mounting same on a molding strip on a wall or other wall portion and which has any or all of the advantages referred to herein including any or all of the features referred to herein, generically and/or specifically, and individually or in combination, and which is of extremely simple, inexpensive construction adapted to be manufactured at very low cost, both with respect to initial tooling cost and the cost of production per unit item, and which is virtually universally adaptable and wall-mountable, such as to be conducive to widespread use of the bracket apparatus for the purposes outlined herein and/or for any other substantially equivalent purposes.

Further objects are implicit in the detailed description which follows hereinafter (which is to be considered as exemplary of, but not specifically limiting, the present invention), and said objects will be apparent to persons skilled in the art after a careful study of the detailed description whch follows hereinafter, and all such implicit objects are intended to be included and comprehended herein as fully as if particularly defined and pointed out herein.

For the purpose of clarifying the nature of the present invention, two exemplary embodiments are illustrated in the hereinbelow-described figures of the accompanying drawings and are described in detail hereinafter.

FIG. 1 is a reduced-size perspective view illustrating a pair of brackets of one exemplary type of the present invention in mounted relationship with respect to the molding strip effectively defining a window frame around a window in a wall. What is known in the prior art as a traverse rod is shown mounted between the pair of brackets and is adapted to carry thereon the upper edge of depending draperies, indicated fragmentarily in phantom in FIG. 1. This view is laterally compressed for space-saving reasons by effectively removing central portions of the wall, molding strip, window, traverse rod, and draperies.

FIG. 2 is an enlarged fragmentary sectional view taken substantially along the plane and in the direction indicated by the arrows 2—2 of FIG. 1.

FIG. 3 is an enlarged fragmentary sectional view taken substantially along the plane and in the direction indicated by the arrows 3—3 of FIG. 1 and FIG. 2.

FIG. 4 is an enlarged fragmentary view taken substantially along the plane and in the direction indicated by the arrows 4—4 of FIG. 1.

FIG. 5 is a fragmentary perspective view of a slight modification of the invention adapted to removably mount a conventional prior art curtain rod instead of a conventional prior art traverse drapery rod, as illustrated in FIGS. 1–4.

FIG. 6 is a fragmentary enlarged sectional view taken substantially along the plane and in the direction indicated by the arrows 6—6 of FIG. 5.

FIG. 7 is a fragmentary perspective view of a further slight modification of the first form of the invention shown in FIGS. 1-4 wherein the attachment and engagement means carried by each of the brackets is modified in a manner such as to be capable of receiving and firmly supporting an intermediate portion of a traverse drapery rod rather than just an end portion as was true of the first form of the invention illustrated in FIGS. 1–4. Of course, it should be understood that the modified attachment and engagement means of FIG. 7 may also receive and properly support an intermediate portion of a curtain rod, if desired, although since curtains are normally not as heavy as draperies, this modification of the invention is more needed as an intermediate support for a traverse drapery rod, although not so limited.

One exemplary form of the bracket apparatus of the present invention is indicated at two laterally spaced locations, as generally designated by the reference numeral 20 in each instance. The arrangement is such that each bracket apparatus 20 of the pair thereof shown in FIG. 1 is appropriately transversely spaced from the other to effectively receive and mount a horizontally directed supporting member, such as is generally designated at 22 in FIG. 1, and which may be said to substantially comprise what is usually known in the prior art as a traverse rod which is adapted to slidably mount depending draperies, as generally designated by the reference numeral 24 and shown fragmentarily and in phantom in FIG. 1. However, it should be clearly understood that the invention is not specifically limited to bracket apparatus for mounting such a prior art traverse drapery rod, but may also be slightly modified to mount a conventional curtain rod in the manner illustrated in FIGS. 5 and 6, which will be described in greater detail hereinafter.

In the exemplary first form of the invention illustrated, each of the brackets generally designated at 20 is of similar construction, although laterally positionally reversed. Therefore, only the left exemplary one shown in FIG. 1 will be described in detail hereinafter—it being understood that the same description, considered as being transversely positionally reversed, is equally applicable to the right bracket apparatus 20 shown in FIG. 1.

The exemplary bracket apparatus 20, such as each of the two shown generally in FIG. 1, and illustrated in considerable detail in FIGS. 2–4, includes a substantially vertically directed mounting base strip member, indicated generally at 26, provided at the top thereof with a downwardly open, substantially inverted U-shaped attachment hook, indicated generally at 28, adapted to slip over and engage a corresponding top portion 30 of a horizontally transversely directed molding strip or effective upper window frame portion, such as is indicated generally at 32. Normally, such a molding strip or window frame portion 32 is mounted outwardly of the outer surface, such as shown at 34, of a wall, such as is generally designated at 36, with an upper portion of the molding strip 32 being either slightly physically separated from the surface 34 of the wall 36 or being capable of being easily so separated by forcing a knife blade or other thin, flat object downwardly between the rear surface of the molding strip 32 and the front surface 34 of the wall 36 to allow the downward insertion therebetween of the rear downwardly directed portion 38 of the attachment hook 28 into a mounting relationship such as is best shown in FIGS. 1 and 2.

The lower portion of the vertically directed mounting base strip member 26 is adapted to rest against the outer surface of the molding strip 32, which may include a vertically directed molding strip portion joined at the corner to the horizontally directed molding strip portion so as to define corresponding side and top window frame portions around a window, such as is generally designated at 40. In the exemplary first form of the invention illustrated, the entire window frame portion made up of both a pair of horizontally directed and a pair of vertically directed molding strip portions is designated by the same reference numeral 32. However, it should be noted that the molding strip may be modified in a number of different ways provided that there is a top portion capable of receiving the attachment hook means 28 thereover—and all such arrangements are intended to be included and comprehended within the broad scope of the present invention.

In the exemplary first form of the invention illustrated, the lower end of each mounting base strip member 26 is provided with a compressible frictional mar-prevention contact means 42 which may comprise a small pad of plastic, rubber, or the like, and which preferably is of a foam or sponge type although not specifically so limited, and which acts to frictionally engage the corresponding portion of the vertical part of the molding strip 32 or, in the absence thereof, a corersponding portion of the front surface 34 of the wall 36 so as to both frictionally immobilize the lower portion of the mounting base strip member 26 and to prevent any marring or damage to the underlying surface of the molding strip 32 or wall surface 34.

In the exemplary first form of the invention illustrated, each of the mounting base strip members 26 is removably provided with a rearwardly directed edge engagement member, such as is generally designated at 44, adapted to engage a corresponding side edge of a vertically directed side window-frame-defining part of the molding strip 32 and also to similarly act as a lateral edge limiting means for corresponding side edges of the draperies 24. However, it should be noted that each of the side edge engagement members 44 may be modified or eliminated entirely in certain forms of the invention. In the example illustrated, it is mounted in removable and adjustable relationship by the fastening means 45 is a manner which will be described in greater detail hereinafter.

Each of the mounting base strip members 26 is provided with a substantially perpendicular and forwardly or outwardly extending projection member, such as is indicated generally at 46, which is provided adjacent to its forward or outer end 48 with attachment and engagement means, such as is generally designated at 50, cooperable for removable supporting attachment and engagement with respect to a corresponding end portion 52 of a horizontally directed supporting member such as the previously mentioned traverse rod 22, which is adapted to extend transversely horizontally parallel to the surface 34 of the wall 36 at a distance outwardly spaced therefrom substantially determined by the forward length of each of said projection members 46.

In the exemplary first form of the invention illustrated, each of said attachment and engagement means 50 effectively comprises a transversely directed, upwardly open, receiving trough member 54 which is effectively fastened to the corresponding outer end 48 of the corresponding projection member 46, with the receiving trough members 54 of each of the two attachment means 50 carried by the projection members 46 of each of the two laterally spaced brackets 20 of FIG. 1, being similarly transversely directed toward each other in aligned relationship, so that the opposite ends 52 of the traverse rod member 22 can be vertically moved downwardly thereinto and engaged therewith (usually resiliently frictionally engaged therewith although not specifically so limited) and held in such engaged relationship in the manner best shown in FIGS. 1 and 2. However, when the traverse rod 22 is to be removed from the attachment and engagement means 50, it is only necessary to forcibly move the ends, 52 thereof upwardly out of the corresponding receiving troughs 54 until they become completely disengaged from each other. Such engagement and/or disengagement operations are, of course, necessary upon initially assembling the complete apparatus or upon disassembling same at any time and may facilitate the mounting of drapery hooks or rings 56 thereon when draperies such as shown at 24 are transversely slidably mounted thereon in depending relationship with respect thereto.

In the exemplary first form of the invention illustrated, the effective mounting of each of the attachment and engagement upwardly open receiving troughs 54 to the outer ends 48 of the projection members 46 is effectively accomplished by way of controllably operable telescopic extension means, such as generally designated by the reference numeral 58 in each of the two cases. However, the invention is not specifically so limited.

Each of the telescopic extension means 58, in the exemplary first form of the invention illustrated, comprises a pair of longitudinal channel or track means 60 carried by the corresponding projection member 46 and a track follower means or plate 62 curved in a manner such that the edges 64 thereof are slidably mounted in the pair of longitudinal channel or track means 60 for slidable extension or retraction with respect thereto. The track means 60 and track follower means 62 may be provided with means for locking same in any of various different desired relative extensional or retractional positions. In the exemplary form of the invention illustrated, this comprises a longitudinal horizontally directed slot means 66 in the projection member 46 and locking set screw means 68 threaded into threaded aperture means 70 positioned in the track follower means 62. The arrangement is such that the enlarged head 72 of the set screw 68 lies along the outside of the slot means 66 and can be threadedly tightened thereagainst in a frictionally locking manner anywhere along the length thereof, thus, correspondingly locking the track follower plate means 62 in any relative longitudinally extended or retracted position with respect to the corresponding projection member 46.

In the exemplary first form of the invention illustrated, additional adjustment means is provided and takes the form of controllable, lockable, and unlockable vertical position-adjustment means, such as is generally designated at 74, which is effectively coupled between the mounting base strip member 26 and a transversely flanged rear end portion 76 of the projection member 46 in a manner operable to allow relative positional vertical adjustment thereof and the subsequent locking thereof in any such vertically adjusted position.

In the exemplary first form of the invention illustrated, the above-mentioned vertical position-adjustment means indicated generally at 74 comprises a vertical slot-defining means or portion 78 of the mounting strip member 26 defining therebetween the vertical slot 80 and mounting screw or threaded fastener screw or bolt means 82 carried by the previously mentioned flanged rear end portion 76 of the projecting member 46 and vertically extending through the slot 80 within the slot-defining portion 78 and having threaded locking means, in the example illustrated taking the form of interiorly threaded nut means 84 adapted to be tightened on the corresponding threaded fastener screw or bolt means 82 so as to frictionally lock the entire vertical position-adjustment means 74 in any selected relative vertical position while at the same time locking a mounting portion 86 of the previously mentioned rearwardly directed edge engagement member 44 in mounted relationship with respect thereto but in a manner which may be controllably adjusted when the threaded screw or bolt means 82 and nut means 84 are loosened.

FIGS. 5 and 6 illustrate a slight modification of the first form of the invention and, therefore, similar parts are designated by similar reference numerals, followed by the letter $a$, however. In this modification, it will be noted that each bracket, such as the one shown at 20a, is substantially the same as each bracket 20 of the first form of the invention with the exception of the attachment and engagement means, designated at 50 in the first form of the invention and designated at 50a in the second form of the invention, wherein it no longer comprises means for mounting a traverse drapery rod, such as that shown at 22 in the first form of the invention, but instead comprises means for mounting a conventional curtain rod such as that shown at 22a in the second form of the invention. Therefore, in the modification illustrated in FIGS. 5 and 6, the attachment and engagement means 50a comprises an outwardly directed engagement member 54a having an insertion end 55 adapted to slip into the corresponding open end 57 of the conventional curtain rod 22a and to have the upwardly directed fastening pin 59 extend through an engagement hole 61 of the conventional curtain rod 22a whereby to removably mount the curtain rod 22a in a conventional manner. Otherwise, this modification of the invention is substantially the same as the first form of the invention, and in view of the detailed description of the first form of the invention set forth hereinbefore, no specific particularized description beyond that just set forth above of the modification of FIGS. 5 and 6 is thought necessary or desirable.

FIG. 7 illustrates a very slight modification of either the first or second form of the invention and pertains primarily to the attachment and engagement means which, in this case, is designated generally by the reference numeral 50b, which is shown modified in FIG. 7 from the showing of the corresponding attachment and engagement means 50 of the first form of the invention shown in FIGS. 1–4 so that the trough member 54b now lies at the outer end of the whole attachment and engagement means 50b at the outer end of the corresponding track follower means or plate 62b and is open ended at each lateral end of the trough member 54b so that a traverse rod 22b can pass completely laterally through the opposite open ends of the trough member 54b, thus making it possible for the modified trough member 54b to support an intermediate portion of the traverse rod 22b which may be of considerable importance since, when the traverse rod 22b is quite long and is supported at opposite ends in a manner similar to the showing of FIG. 1, there may be a tendency for the center portion of the traverse rod to sag under the weight of very heavy draperies similar to those shown at 24 in FIG. 1, for example, and, when such is the case, the modified form of the invention illustrated in FIG. 7 may be mounted at a central or other appropriate intermediate position so that the trough member 54b can properly support the central or intermediate portion of the traverse drapery rod member 22b, thus preventing it from sagging in the center as might otherwise be the case. This central mounting of the modified from of the invention illustrated in FIG. 7 may require a slight modification of the shape of the base strip member 26b so that it can appropriately cooperate with the differently shaped center or intermediate part of the upper molding strip or upper window frame molding strip portion indicated fragmentarily at 32b. One such modified shape of the base strip member 26b is shown in FIG. 7, but it should be understood that various modifications thereof are intended to be included and comprehended within the broad scope of the invention.

It should also be understood that the modified form of the invention illustrated in FIG. 7 may support an intermediate potrion of a curtain rod just as well as a traverse drapery rod, and the intermediate rod portion shown fragmentarily at 22b in FIG. 7 is intended to designate either such a traverse drapery rod or such a curtain rod intermediate portion, and, of course, the size or shape or construction thereof may be modified substantially, and the shape of the supporting trough 54a may be correspondingly modified substantially, all within the broad scope of the present invention.

It should be understood that the figures and the specific description thereof set forth in this application are for the purpose of illustrating the present invention and are not to be construed as limiting the present invention to the precise and detailed structure shown in the figures and specifically described hereinbefore. Rather, the real invention is intended to include substantially equivalent constructions embodying the basic teachings and inventive concept of the present invention.

I claim:

1. Bracket apparatus removably mountably cooperable with a molding strip on a wall for removably mounting a horizontally directed supporting member adapted to support curtains or draperies, comprising: a mounting base strip member provided at the top thereof with a downwardly open attachment hook adapted to slip over and engage a corresponding top portion of a molding strip mounted on a wall, said mounting base strip member including compressible frictional mar-prevention contact means carried by at least a portion of said mounting base strip member for non-marring contact with a rearwardly adjacent portion of a window frame-defining molding strip, said mounting base strip member being substantially vertically directed and being adapted to lie against a vertically directed molding strip extending downwardly from a corner junction with a transversely directed molding strip adapted to receive said attachment hook thereover, said mounting base strip member being removably provided with a rearwardly directed edge engagement member adapted to engage an outer edge of a vertically directed window frame-defining molding strip, said mounting base strip member being provided with a forwardly extending projection member having attachment and engagement means for removable supporting attachment and engagement with respect to a corresponding end portion of a horizontally directed supporting member adapted to extend transversely horizontally parallel to the surface of a wall at a distance outwardly spaced therefrom substantially determined by the forward length of each of two of such projection members attached and engaged with respect to opposite ends thereof and adapted to support an upper edge of curtains or draperies thereon, said forwardly extending projection member being provided with controllably adjustable, effective telescopic extension means positioned effectively behind said attachment and engagement means for controllably extending the effective forward length of said projection member, said controllably adjustable telescopic extension means comprising longitudinal effective track means carried by said projection member and track follower means slidably adjustably mounted in said track means and controllably adjustable locking set screw means for locking said track follower means in any selected longitudinal position with respect to said track means; and controllably lockable and unlockable vertical position adjustment means effectively coupled between said mounting base strip member and a rear end portion of said projection member and operable to allow relative positional vertical adjustment thereof and the subsequent locking thereof in such an adjusted position, said vertical position adjustment means comprising a vertical slot-defining portion carried by said mounting base strip member and mounting effective stud means carried by a rear portion of said projection member and vertically slidably extending through said slot-defining portion of said mounting base strip member and threaded locking means associated therewith for frictionally locking same in any vertically adjusted position with respect to said slot-defining portion of said mounting base strip member.

References Cited

UNITED STATES PATENTS

| 784,155 | 3/1905 | Haas | 248—257 |
| 1,250,846 | 12/1915 | Gessner | 248—257 |
| 1,397,456 | 11/1921 | Robinson | 248—270 |
| 2,460,193 | 1/1949 | Raudenkolb | 248—265 X |
| 2,677,523 | 5/1954 | Henley | 248—265 |
| 2,783,014 | 2/1957 | Kenney | 248—265 X |

FOREIGN PATENTS

| 9,482 | 1911 | Great Britain. |

ROY D. FRAZIER, *Primary Examiner.*

J. FRANKLIN FOSS, *Assistant Examiner.*

U.S. Cl. X.R.

248—258; 211—105.2